(12) United States Patent
Liu et al.

(10) Patent No.: US 9,261,715 B2
(45) Date of Patent: Feb. 16, 2016

(54) THERMOCHROMATIC DEVICE AND THERMOCHROMATIC DISPLAY APPARATUS

(71) Applicants: Tsinghua University, Beijing (CN); HON HAI PRECISION INDUSTRY CO., LTD., New Taipei (TW)

(72) Inventors: Peng Liu, Beijing (CN); Duan-Liang Zhou, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 30 days.

(21) Appl. No.: 13/947,578

(22) Filed: Jul. 22, 2013

(65) Prior Publication Data

US 2014/0177029 A1    Jun. 26, 2014

(30) Foreign Application Priority Data

Dec. 22, 2012 (CN) .......................... 2012 1 0561898

(51) Int. Cl.
*G02F 1/01* (2006.01)
*G02B 26/00* (2006.01)

(52) U.S. Cl.
CPC .................................. *G02F 1/0147* (2013.01)

(58) Field of Classification Search
USPC ......... 359/288, 265–277, 245, 247, 254, 242, 359/240, 250, 253, 315, 318, 321; 349/49, 349/105
See application file for complete search history.

(56) References Cited

U.S. PATENT DOCUMENTS 7,933,058 B2 * 4/2011 Liu et al. .................. 359/288
8,614,849 B2 12/2013 Liu et al.
2011/0149372 A1 * 6/2011 Liu et al. .................. 359/288

FOREIGN PATENT DOCUMENTS

TW  201033716  9/2010
TW  201133108  10/2011

* cited by examiner

*Primary Examiner* — Joseph P Martinez
*Assistant Examiner* — Brandi Thomas
(74) *Attorney, Agent, or Firm* — Novak Druce Connolly Bove + Quigg LLP

(57) ABSTRACT

A thermochromatic device in a thermochromatic display includes an insulating substrate, a color element, a heating element, a first electrode, and a second electrode, the color element and the heating element located on the insulating substrate being virtually integral but together are physically isolated and heat-insulated and allow such fast electrically-governed color changes that moving color images can be displayed.

20 Claims, 14 Drawing Sheets

THERMOCHROMATIC DEVICE AND THERMOCHROMATIC DISPLAY APPARATUS

CROSS-REFERENCE TO RELATED APPLICATIONS

This application claims all benefits accruing under 35 U.S.C. §119 from China Patent Application No. 201210493750.8, filed on Nov. 28, 2012 in the China Intellectual Property Office, disclosure of which is incorporated herein by reference.

BACKGROUND

1. Technical Field

The present disclosure relates to a thermochromatic device and thermochromatic display apparatus using the same.

2. Description of Related Art

Thermochromatic materials are materials that change their color in response to changes in temperature. Thermochromatic materials can be used to make a thermochromatic device. A thermochromatic device usually includes a heater made of ceramics, conductive glasses or metals. However, the speed of color change of the thermochromatic device is slow because the relatively high heat capacity per unit and slow heating speed of the heater.

In US20110149373A1 published on Jun. 23, 2011, Liu et al. discloses a thermochromatic device to overcome the above shortcomings. Referring to FIGS. 13 and 14, the thermochromatic device 120 of Liu et al. includes an insulating substrate 102, a color element 118, a heating element 108, a first electrode 110, and a second electrode 112. However, the heating response speed of the thermochromatic device 120 is relatively slow, usually above 5 seconds, because the color element 118 and/or heating element 108 are in contact with the insulating substrate 102. Thus, the response speed of the thermochromatic device 120 is relatively slow.

What is needed, therefore, is to provide a thermochromatic device having an improved color change speed and thermochromatic display apparatus using the same.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

References will be made to the drawings to describe various embodiments of the present thermochromatic devices and thermochromatic display apparatus using the same.

Figure 1:
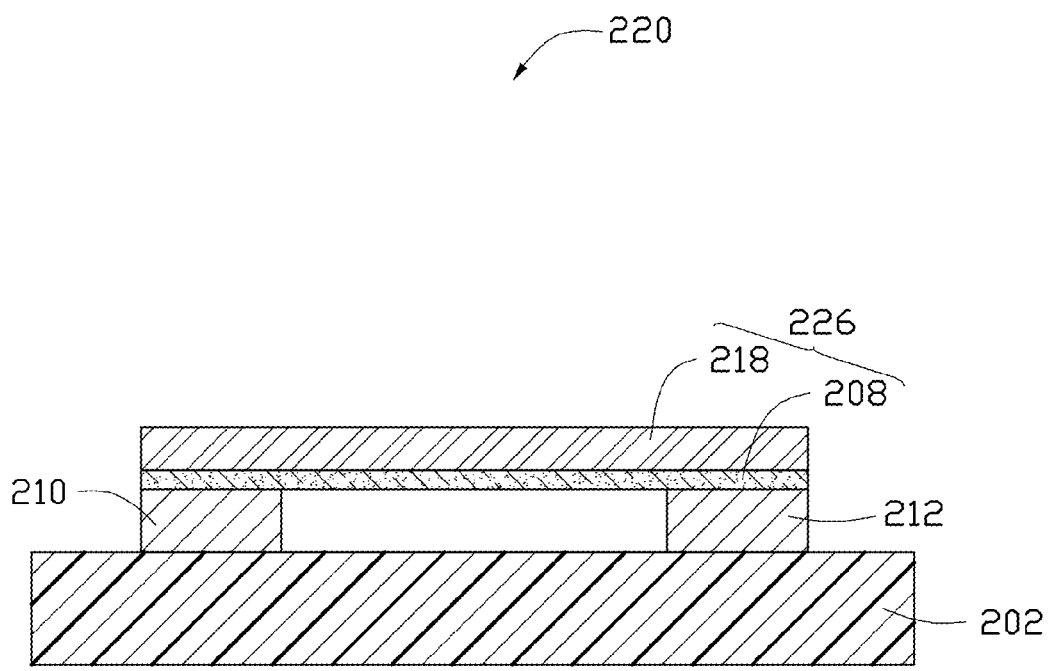
FIG. 1 is a schematic view of a first embodiment of a thermochromatic device.

Referring to FIG. 1, a thermochromatic device 220 of a first embodiment includes an insulating substrate 202, a color element 218, a heating element 208, a first electrode 210, and a second electrode 212.

The color element 218 and the heating element 208 are combined with each other to form a composite 226. The composite 226 is a free-standing structure. The term "free-standing structure" means that the composite 226 can sustain the weight of itself when it is hoisted by a portion thereof without any significant damage to its structural integrity, so that at least one part of the composite 226 can be free of contact with any other surface, to permit rapid temperature changes. In one embodiment, at least one part of the composite 226 can be suspended over the insulating substrate 202 and supported by the first electrode 210 and the second electrode 212. In one embodiment, at least one part of the composite 226 can be suspended over the insulating substrate 202 and supported by two supporting elements spaced from each other. In one embodiment, at least one part of the composite 226 can be suspended over a recess defined in the insulating substrate 202. The at least one part of the composite 226 is suspended means the at least one part of the composite 226 is free of contact with any other surface, to permit rapid temperature changes. In use, the thermochromatic device 220 is located in a vacuum or a space filled with inert gas.

In one embodiment, the heating element 208 forms a matrix, and the color element 218 is dispersed in the heating element 208. In one embodiment, the color element 218 forms a matrix, and the heating element 208 is dispersed in the color element 218. In one embodiment, both the heating element 208 and the color element 218 are layers and stacked on each other. For example, two heating elements 208 can be located on two opposite surfaces of a single color element 218, that is, the single color element 218 is sandwiched between two heating elements 208. For another example, two color elements 218 can be located on opposite surfaces of a single heating element 208, that is, the single heating element 208 is sandwiched between two color elements 218. For example, a plurality of color elements 218 and a plurality of heating elements 208 can be alternately stacked on each other to form a multi-layer structure.

The insulating substrate 202 may be made of rigid material or flexible material. The rigid material may be ceramic, glass, quartz, resin, silicon, silicon dioxide, diamond, or alumina. The flexible material may be flexible polymer, fiber, or synthetic paper. The flexible polymer can be polyethylene terephthalate (PET), polycarbonate (PC), polyethylene (PE), or polyimide (PI). When the insulating substrate 202 is made of flexible material, the thermochromatic device 220 can be folded into random shapes for and during use. The melting point of the insulating substrate 202 is equal to or higher than 200° C. A size and a thickness of the insulating substrate 202 can be chosen according to need. In one embodiment, the insulating substrate 202 is a PET film with a thickness of about 1 millimeter.

The heating element 208 is a free-standing structure and can be made of material such as metal, alloy, or carbon nanotubes. In one embodiment, the heating element 208 includes a carbon nanotube structure. The carbon nanotube structure includes a plurality of carbon nanotubes uniformly distributed therein, and the carbon nanotubes therein are combined by van der Waals attractive force therebetween. The carbon nanotube structure can be a substantially pure structure of carbon nanotubes. The carbon nanotubes can be used to form many different structures and provide a large specific surface area. The heat capacity per unit area of the carbon nanotube structure can be less than $2 \times 10^{-4}$ J/m²·K. In one embodiment, the heat capacity per unit area of the carbon nanotube structure is less than $1.7 \times 10^{-6}$ J/m²·K. As the heat capacity of the carbon nanotube structure is very low, a fast heating and fast cooling of the heating element 208 results in substantially instant temperature changes in the composite 226, allowing a high heating efficiency and accuracy. As the carbon nanotube structure is substantially pure, the carbon nanotubes are not easily oxidized and the life of the heating element 208 will be relatively long. Further, the carbon nanotubes have a low density, about 1.35 g/cm³, so the heating element 208 is lightweight. As the heat capacity of the carbon nanotube structure is very low, the heating element 208 has a high response heating speed. Because the carbon nanotube has a large specific surface area, the carbon nanotube structure with a plurality of carbon nanotubes has a large specific surface area. When the specific surface area of the carbon nanotube structure is large enough, the carbon nanotube structure is self-adhesive and can be directly applied to a surface.

The carbon nanotubes in the carbon nanotube structure can be arranged orderly or disorderly. The term 'disordered carbon nanotube structure' includes, but is not limited to, a structure where the carbon nanotubes are arranged along many different directions, and the aligning directions of the carbon nanotubes are random. The number of the carbon nanotubes arranged along each different direction can be almost the same (e.g. uniformly disordered). The disordered carbon nanotube structure can be isotropic. The carbon nanotubes in the disordered carbon nanotube structure can be entangled with each other.

The carbon nanotube structure including ordered carbon nanotubes is an ordered carbon nanotube structure. The term 'ordered carbon nanotube structure' includes, but is not limited to, a structure where the carbon nanotubes are arranged in a consistent manner, e.g., the carbon nanotubes are arranged approximately along a same direction and/or have two or more sections within each of which the carbon nanotubes are arranged approximately along a same direction (different sections can have different directions). The carbon nanotubes in the carbon nanotube structure can be single-walled, double-walled, or multi-walled carbon nanotubes.

The carbon nanotube structure can be a carbon nanotube film structure with a thickness ranging from about 0.5 nanometers to about 1 millimeter. The carbon nanotube film structure can include at least one carbon nanotube film. The carbon nanotube structure can also be a linear carbon nanotube structure with diameters ranging from about 0.5 nanometers to about 1 millimeter. The carbon nanotube structure can also be a combination of the carbon nanotube film structure and the linear carbon nanotube structure. It is understood that any carbon nanotube structure described can be used with all embodiments.

Figure 2:
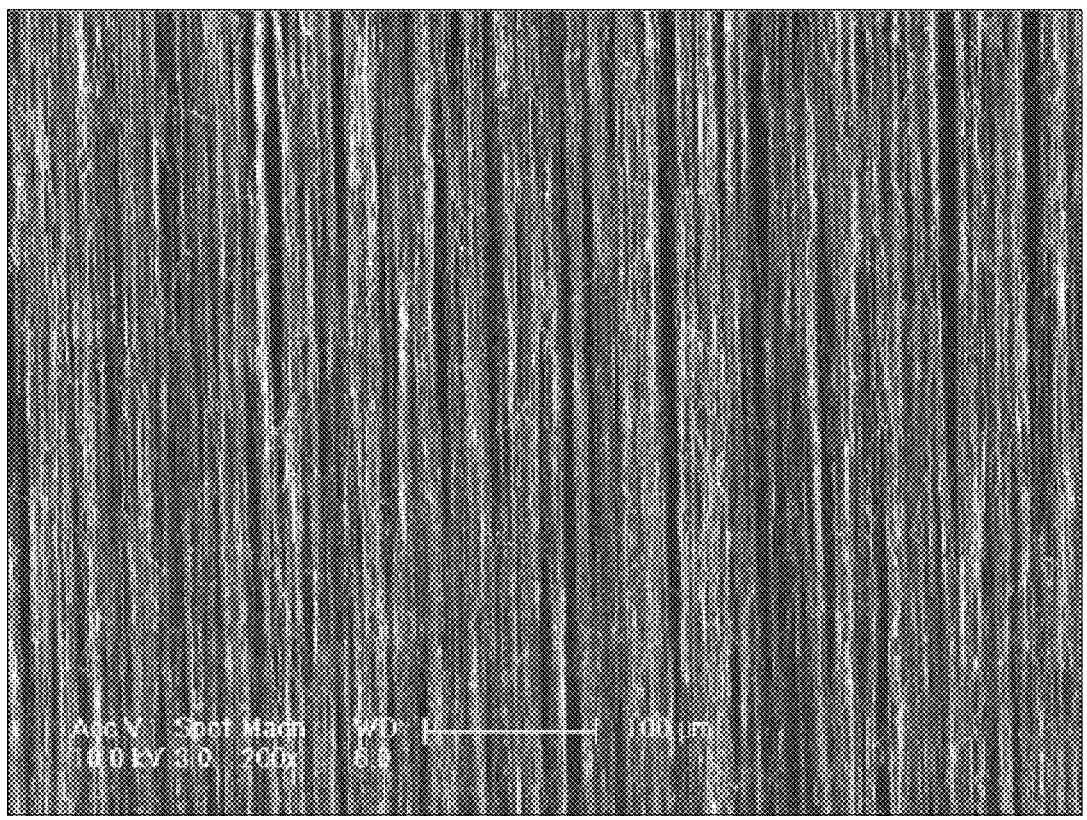
FIG. 2 is a Scanning Electron Microscope (SEM) image of a drawn carbon nanotube film.
Figure 3:
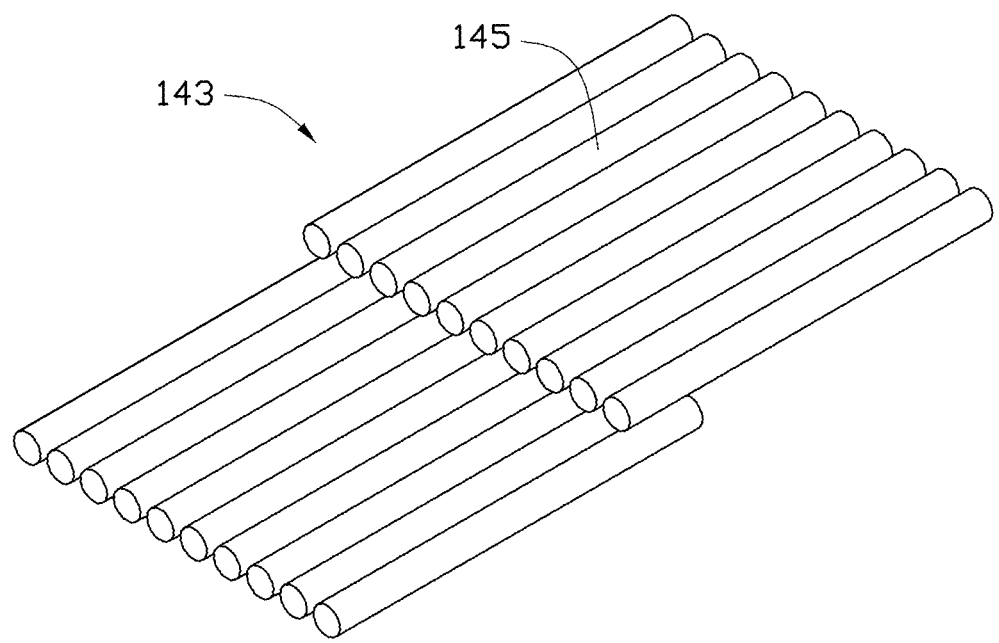
FIG. 3 is a schematic of a carbon nanotube segment.

In one embodiment, the carbon nanotube film structure includes at least one drawn carbon nanotube film. A drawn carbon nanotube film can be drawn from a carbon nanotube array that is able to have a film drawn therefrom. The drawn carbon nanotube film includes a plurality of successive and orderly arranged carbon nanotubes joined end-to-end by van der Waals attractive force therebetween. The drawn carbon nanotube film is a free-standing film. Referring to FIGS. 2 to 3, each drawn carbon nanotube film includes a plurality of carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. As can be seen in FIG. 2, some variations can occur in the drawn carbon nanotube film. The carbon nanotubes 145 in the drawn carbon nanotube film have a preferred orientation. The carbon nanotube film can be treated with an organic solvent to increase the mechanical strength and toughness and reduce the coefficient of friction of the carbon nanotube film. A thickness of the carbon nanotube film ranges from about 0.5 nanometers to about 100 micrometers. In one embodiment, the heating element 208 is a single drawn carbon nanotube film with a length of 300 micrometers and a width of 100 micrometers. The carbon nanotubes of the heating element 208 extend from the first electrode 210 to the second electrode 212. The drawn carbon nanotube film can be attached to surfaces of the insulating substrate 202 with an adhesive, by mechanical force, by the self-adhesive properties of the carbon nanotube film, or by a combination thereof. The response speed of the drawn carbon nanotube film is very high because of the very low heat capacity per unit area, the large surface area, and the large radiation coefficient. The single drawn carbon nanotube film with a length of 300 micrometers and a width of 100 micrometers can be heated to a temperature of 2000 Kelvin in 1 millisecond.

The carbon nanotube film structure of the heating element 208 can include at least two stacked drawn carbon nanotube films. In other embodiments, the carbon nanotube structure can include two or more coplanar carbon nanotube films, and can include layers of coplanar carbon nanotube films. Additionally, when the carbon nanotubes in the carbon nanotube film are aligned along one preferred orientation (e.g., as in the drawn carbon nanotube film), an angle can exist between the orientation of carbon nanotubes in adjacent films, whether the films are stacked on each other or arranged side by side. Adjacent carbon nanotube films can be combined by only the van der Waals attractive force. The number of layers of carbon nanotube films is not limited. However the thicker the carbon nanotube structure, the smaller the specific surface area will be. An angle between the aligned directions of the carbon nanotubes in two adjacent carbon nanotube films can range from about 0° to about 90°. When the angle between the aligned directions of the carbon nanotubes in adjacent stacked carbon nanotube films is larger than 0 degrees, a microporous structure is defined by the carbon nanotubes in the heating element 208. The carbon nanotube structure in an embodiment employing these films will have a plurality of micropores. Stacking the carbon nanotube films will also add to the structural integrity of the carbon nanotube structure. In some embodiments, the carbon nanotube structure is a free standing structure.

In another embodiment, the carbon nanotube film structure includes a flocculated carbon nanotube film. The flocculated carbon nanotube film can include a plurality of long, curved, disordered carbon nanotubes entangled with each other. Further, the flocculated carbon nanotube film can be isotropic. The carbon nanotubes can be substantially uniformly dispersed in the carbon nanotube film. Adjacent carbon nanotubes are subject to van der Waals attractive force to form an entangled structure with micropores defined therein. It is understood that the flocculated carbon nanotube film is very porous. Sizes of the micropores can be less than 10 micrometers. The porous nature of the flocculated carbon nanotube film will increase specific surface area of the carbon nanotube structure. Further, due to the carbon nanotubes in the carbon nanotube structure being entangled with each other, the carbon nanotube structure employing the flocculated carbon nanotube film will have excellent durability, and can be fashioned into desired shapes with a low risk of breaking or cracking of the carbon nanotube structure. The flocculated carbon nanotube film, in some embodiments, will not require the use of the planar supporter 18 due to the carbon nanotubes being entangled and adhering together by van der Waals attractive force therebetween. The thickness of the flocculated carbon nanotube film ranges from about 0.5 nanometers to about 1 millimeter.

In another embodiment, the carbon nanotube film structure can include at least one pressed carbon nanotube film. The pressed carbon nanotube film can be a free-standing carbon nanotube film. The carbon nanotubes in the pressed carbon nanotube film are arranged along a same direction or arranged along different directions. The carbon nanotubes in the pressed carbon nanotube film can rest upon each other. Adjacent carbon nanotubes are attracted to each other and combine by van der Waals attractive force. An angle between a primary alignment direction of the carbon nanotubes and a surface of the pressed carbon nanotube film is 0 degrees to approximately 15 degrees. The greater the pressure applied, the smaller the resulting angle. When the carbon nanotubes in the pressed carbon nanotube film are arranged along different directions, the carbon nanotube structure can be isotropic. The thickness of the pressed carbon nanotube film ranges from about 0.5 nanometers to about 1 millimeter.

Carbon nanotube structures include linear carbon nanotube structures. In other embodiments, the linear carbon nanotube structures, including carbon nanotube wires and/or carbon nanotube cables, can be used.

Figure 4:
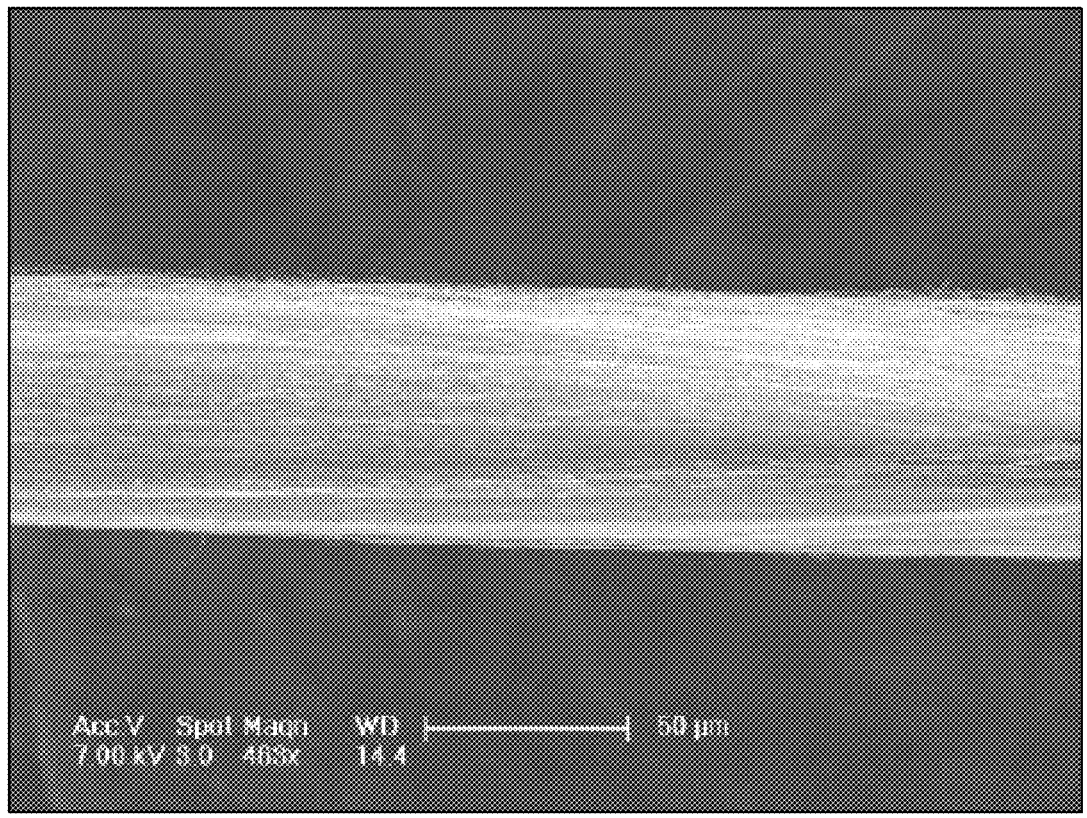
FIG. 4 is an SEM image of an untwisted carbon nanotube wire.

The carbon nanotube wire can be untwisted or twisted. Treating the drawn carbon nanotube film with a volatile organic solvent untwists the carbon nanotube wire. Specifically, the organic solvent is applied to soak the entire surface of the drawn carbon nanotube film. During the soaking, adjacent parallel carbon nanotubes in the drawn carbon nanotube film will bundle together, due to the surface tension of the organic solvent as it volatilizes, and thus the drawn carbon nanotube film is shrunk into untwisted carbon nanotube wire. Referring to FIG. 4, the untwisted carbon nanotube wire includes a plurality of carbon nanotubes substantially oriented along a same direction (i.e., a direction along the length of the untwisted carbon nanotube wire). The carbon nanotubes are parallel to the axis of the untwisted carbon nanotube wire. More specifically, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity and shape. Length of the untwisted carbon nanotube wire can be arbitrarily set as desired. A diameter of the untwisted carbon nanotube wire ranges from about 0.5 nanometers to about 100 micrometers.

Figure 5:
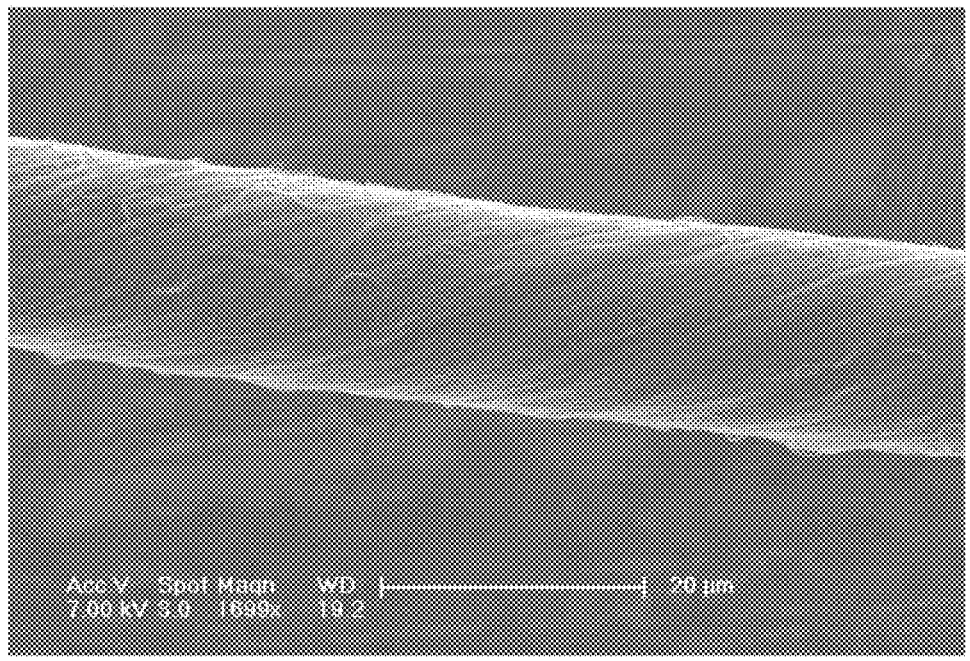
FIG. 5 is an SEM image of a twisted carbon nanotube wire.

The twisted carbon nanotube wire can be formed by twisting a drawn carbon nanotube film using a mechanical force to turn the two ends of the drawn carbon nanotube film in opposite directions. Referring to FIG. 5, the twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each carbon nanotube segment includes a plurality of carbon nanotubes parallel to each other, and combined by van der Waals attractive force therebetween. Length of the carbon nanotube wire can be set as desired. A diameter of the twisted carbon nanotube wire can be from about 0.5 nanometers to about 100 micrometers. Further, the twisted carbon nanotube wire can be treated with a volatile organic solvent after being twisted. After being soaked by the organic solvent, the adjacent paralleled carbon nanotubes in the twisted carbon nanotube wire will bundle together, due to the surface tension of the organic solvent when the organic solvent volatilizes. The specific surface area of the twisted carbon nanotube wire will decrease, while the density and strength of the twisted carbon nanotube wire will be increased.

The carbon nanotube cable includes two or more carbon nanotube wires. The carbon nanotube wires in the carbon nanotube cable can be twisted or untwisted. In an untwisted carbon nanotube cable, the carbon nanotube wires are parallel with each other. In a twisted carbon nanotube cable, the carbon nanotube wires are twisted with each other.

The heating element 208 can include one ore more linear carbon nanotube structures. The plurality of linear carbon nanotube structures can be laid next to each other, crossed with each other, woven together, or twisted with each other. The resulting structure can be a planar structure if desired.

In other embodiments, the carbon nanotube structure can include other materials thus becoming a carbon nanotube composite. The carbon nanotube composite can include a carbon nanotube structure and a plurality of fillers dispersed therein. The filler can be comprised of a material, such as metal, ceramic, glass, carbon fiber or combinations thereof. Alternatively, the carbon nanotube composite can include a matrix and a plurality of carbon nanotubes dispersed therein. The matrix can be comprised of a material such as resin, metal, ceramic, glass, carbon fiber or combinations thereof. In one embodiment, a carbon nanotube structure is packaged in a resin matrix.

The color element 218 is made of thermochromatic material. The color of the thermochromatic material changes with the temperature and will come back to original color as the temperature comes back to the original temperature. The color change temperature of the thermochromatic material is below 200° C. in one embodiment. In one embodiment, the color change temperature of the thermochromatic material is in a range from about 40° C. to about 100° C. so that the thermochromatic device 220 can work in a room temperature environment and have a low working voltage. The thermochromatic material can be inorganic thermochromatic material, organic thermochromatic material, or liquid crystal thermochromatic material.

Inorganic thermochromatic materials include silver iodide, silver complex, silver double salt, copper iodide, copper complex, copper double salt, mercury iodide, mercury complex, mercury double salt, cobalt salt, nickel salt, methenamine compound, vanadium (III) oxide, chromate, or vanadate. Some inorganic thermochromatic materials and their colors, together with color change temperature, are shown in table 1 below.

TABLE 1

Inorganic Thermochromatic Material

| Material (Chemical Formula) | Colors | Color Change Temperature |
|---|---|---|
| $CoCl_2 \cdot 2C_6H_{12}N_4 \cdot 10H_2O$ | Pink-Sky Blue | 39.6° C. |
| $CoI_2 \cdot 2C_6H_{12}N_4 \cdot 10H_2O$ | Pink-Green | 50° C. |
| $CoSO_4 \cdot C_6H_{12}N_4 \cdot 9H_2O$ | Peachblow-Purple | 60° C. |
| $CuSO_4 \cdot 2C_6H_{12}N_4 \cdot 5H_2O$ | Blue-Emerald | 76° C. |
| $NiBr_2 \cdot 2C_6H_{12}N_4 \cdot 10H_2O$ | Green-Blue | 60° C. |
| $NiC_{12} \cdot 2C_6H_{12}N_4 \cdot 10H_2O$ | Green-Yellow | 110° C. |
| $Co(NO_3)_2 \cdot 2C_6H_{12}N_4 \cdot 10H_2O$ | Pink-Crimson | 75° C. |
| $Ag_2HgI_4$ | Yellow-Red | 42° C. |
| $Cu_2HgI_4$ | Carmine-Brick Red | 71° C. |
| $HgI_2$ | Red-Blue | 137° C. |

The organic thermochromatic material includes color fixatives (electron donors), color developing agent (electron acceptors), and solvent. The perceived color of the organic thermochromatic material depends on the color fixatives. The color depth of the organic thermochromatic material depends on the color developing agent. The color change temperature of the organic thermochromatic material depends on the solvent used. The color fixatives can be triarylmethane dyes, fluorane dyes, thiodiphenylamine, spiropyran dyes, Schiff-base dyes, spiro compounds, bianthrone, or combination thereof. The triarylmethane dyes can be crystal violet lactone, or cresol red. The fluorane dyes can be thermochromic red or thermochromic green. The color developing agent includes organic color developing agents or inorganic color developing agents. The inorganic color developing agent can be acid clay, activated clay or kaolin, or magnesium aluminum silicate. The organic color developing agent can be bisphnol A, benzyl hydroxybenzoate, 4-hydroxycoumarin, n-hexanoic acid, caprylic acid, stearic acid, terephthalic acid, or Lewis acid. The solvent can be dodecanol, n-tetradecyl alcohol, hexadecanol, n-octadecyl alcohol, aliphatic ketones, ester, aether, amides, or carboxylic acid compound.

The liquid crystal thermochromatic material can be thermotropic liquid crystals. The thermotropic liquid crystals consist of organic molecules and exhibit a phase transition into the liquid crystal phase as temperature changes. The thermotropic liquid crystals can be divided into nematic liquid crystals, smectic liquid crystals, or cholesteric liquid crystals according to their optical properties. The cholesteric liquid crystals can be made of cholesterin.

The first electrode 210 and the second electrode 212 are spaced from each other and electrically connected with the heating element 208. The first electrode 210 and the second electrode 212 can be located on the surface of the insulating substrate 202, on a surface of the composite 226, or on a supporting element. The first electrode 210 and the second electrode 212 are made of conductive material such as carbon nanotube, metal, alloy, indium tin oxides (ITO), antimony doped tin oxide (ATO), conductive polymer, or a conductive slurry. The first electrode 210 and the second electrode 212 can be conductive sheets with a thickness of about 0.5 nanometers to about 500 micrometers. In one embodiment, the first electrode 210 and the second electrode 212 are formed on the surface of the insulating substrate 202 by a printing process. The conductive slurry is composed of metal powder, glass powder, and binder. The metal powder can be silver powder, the glass powder has low melting point, and the binder can be terpineol or ethyl cellulose (EC). The conductive slurry may include from about 50% to about 90% (by weight) of the metal powder, from about 2% to about 10% (by weight) of the glass powder, and from about 8% to about 40% (by weight) of the binder.

During operation, a voltage is supplied to the first electrode 210 and the second electrode 212. The temperature of the heating element 208 rises and the color element 218 is heated by the heating element 208. When the color element 218 is heated to a color change temperature, the color of the color element 218 will change. For example, the color element 218 made of $Ag_2HgI_4$ will change color from yellow to red when it is heated to a temperature of 42° C. Supplying a constant voltage, the temperature of the color element 218 will remain constant. Therefore, the thermochromatic device 220 will display a constant color. The color displayed by the thermochromatic device 220 can be suddenly changed through changing the voltage supplied to the heating element 208. Because the color element 218 is made of thermochromatic material, the color element 218 will revert to original color as the color element 218 cools and reverts to original temperature.

Because the color element 218 and the heating element 208 form a composite 226 with at least one part free of contact with another element, any heat exchange or loss between the composite 226 and the surrounding environment is minimal as the heating element 208 heats the color element 218. Thus, the color element 218 can be heated to the work temperature rapidly, and the thermochromatic device 220 has an improved heating response speed.

Figure 6:
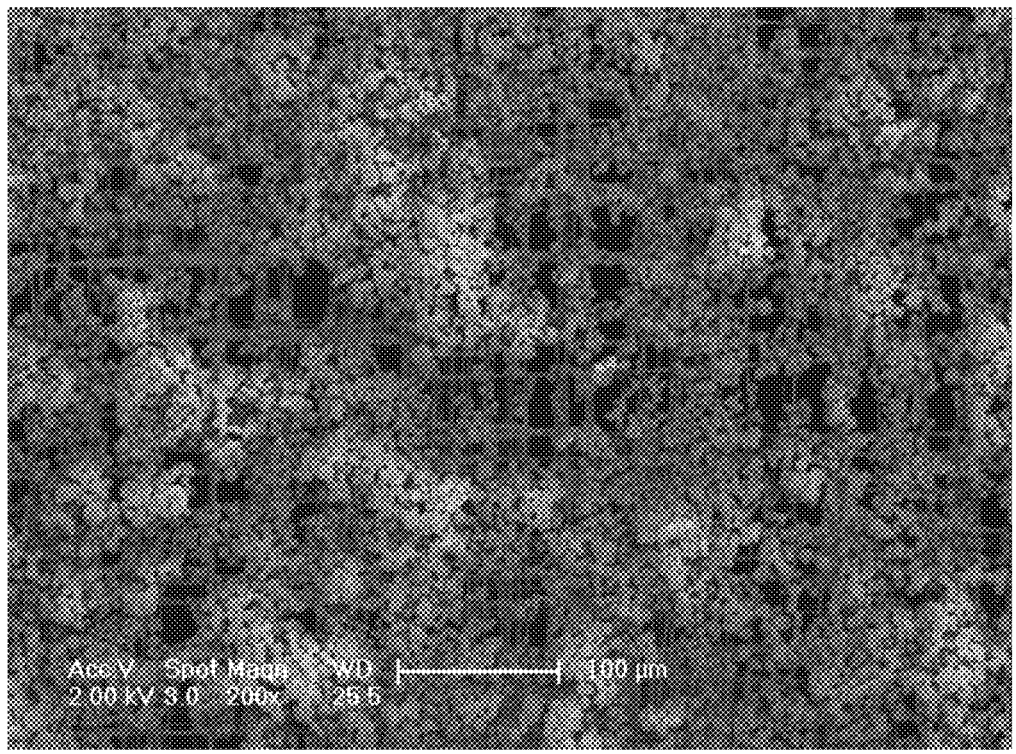
FIG. 6 is an SEM image of a composite of a color element and a heating element of the first embodiment.

A test was performed on both the thermochromatic device 220 and the thermochromatic devices 120 of prior art. In the thermochromatic device 220, the insulating substrate 202 was a PET film with a thickness of about 110 micrometers; the first electrode 210 and the second electrode 212 were formed on the insulating substrate 202 by printing conductive slurry; the heating element 208 included two stacked drawn carbon nanotube films; the color element 218 was a layer of $Ag_2HgI_4$ with a thickness from about 10 micrometers to about 500 micrometers and deposited on the two stacked drawn carbon nanotube films by a sputtering or thermal deposition process; the composite 226 was suspended over the first electrode 210 and the second electrode 212. As shown in FIG. 6, the angle between the aligned directions of the carbon nanotubes in two adjacent carbon nanotube films was about 90°, and a layer of $Ag_2HgI_4$ was coated on a surface of the two stacked drawn carbon nanotube films. The thermochromatic devices 120 of prior art had a structure as shown in FIGS. 1-2. The thermochromatic devices 120 of prior art had the same experimental parameters as the thermochromatic device 220.

The test results are shown in table 2 below. The heating response speed of the thermochromatic device 220 was improved significantly compared with the thermochromatic devices 120 of prior art. The heating and cooling response speed of the thermochromatic device 220 was faster than the heating response speed of the thermochromatic devices 120 of prior art. A heating response time of about 2.3 seconds was obtained, faster than heating response times of about 5.2 and 6.6 seconds for the thermochromatic devices 120 of prior art. A cooling response time of about 1.7 seconds was obtained, faster than heating response times of about 5 and 6.6 seconds for the thermochromatic devices 120 of prior art.

TABLE 2 experimental parameters and testing results

Figure 13:
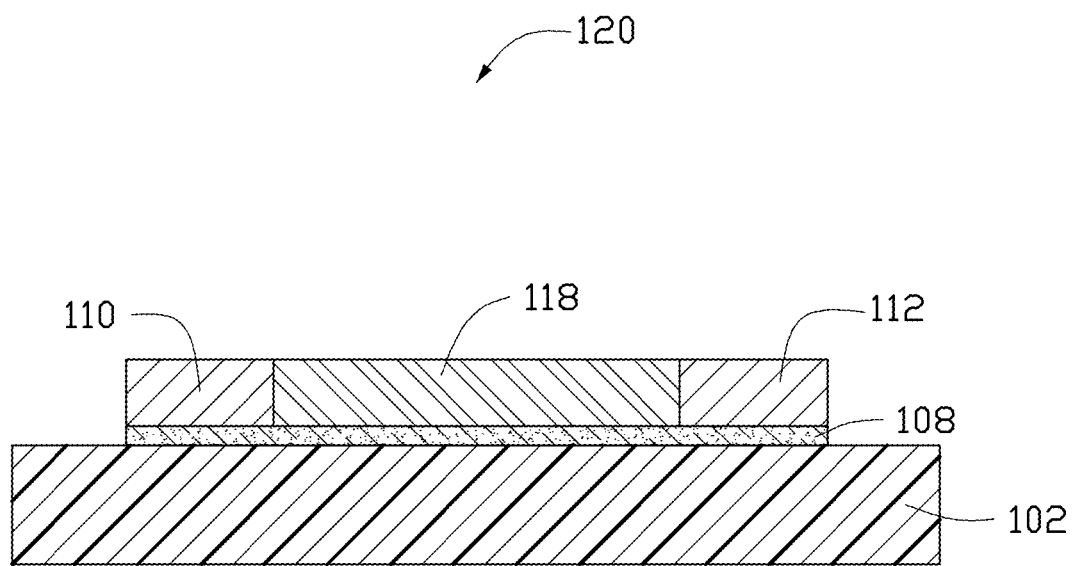
FIGS. 13-14 are schematic views of thermochromatic devices of prior art.
Figure 14:
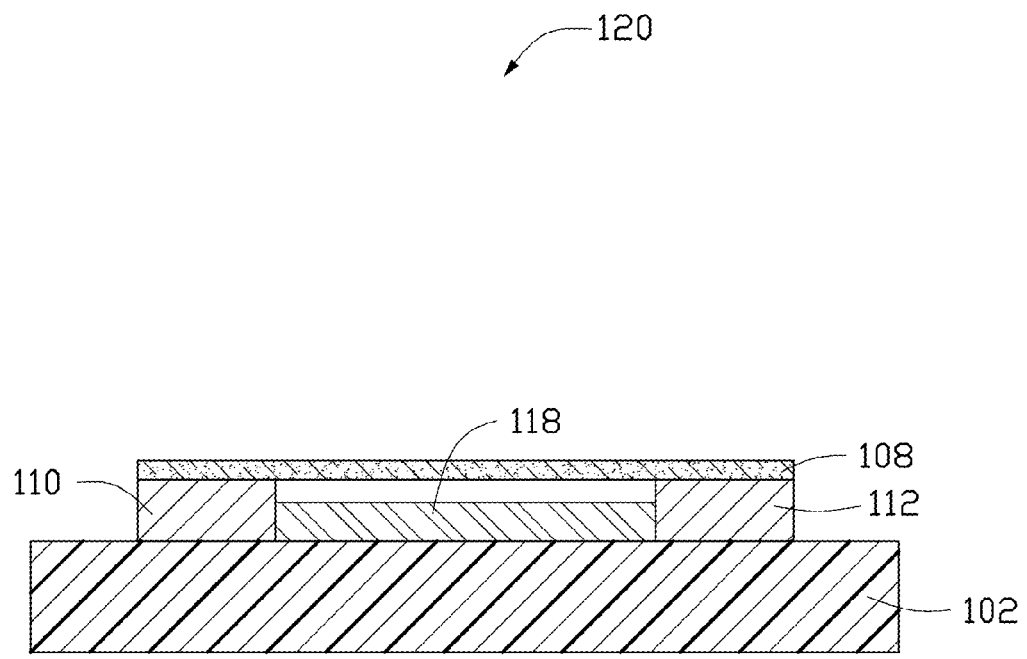

| | thermochromatic device of FIG. 13 | thermochromatic device of FIG. 14 | Thermochromatic device of FIG. 1 |
|---|---|---|---|
| insulating substrate | PET sheet of 110 micrometers thickness | PET sheet of 110 micrometers thickness | PET sheet of 110 micrometers thickness |
| heating element | two stacked drawn carbon nanotube films with 90° angle between | two stacked drawn carbon nanotube films with 90° angle between | two stacked drawn carbon nanotube films with 90° angle between |
| color element | $Ag_2HgI_4$ with 200 micrometers thickness | $Ag_2HgI_4$ with 200 micrometers thickness | $Ag_2HgI_4$ with 200 micrometers thickness |
| color change time on heating | 6.6 seconds | 5.2 seconds | 2.3 seconds |
| color change time on cooling | 6.6 seconds | 5 seconds | 1.7 seconds |

When the thermochromatic device 220 is used in the thermochromatic display apparatus by a consumer, the thickness of the insulating substrate 202 will be usually above 110 micrometers, or the insulating substrate 202 will be located on a plate or other supporting surface. In another test, the thermochromatic device 220 of FIG. 1, the thermochromatic device 120 of FIG. 13, and the thermochromatic device 120 of FIG. 14 were all located on a glass plate which had a thickness of about 1 millimeter. The heating response time of the thermochromatic devices 120 in FIGS. 13 and 14 was greater than 10 seconds, but the heating response time of the thermochromatic device 220 of FIG. 1 was still about 2 seconds.

Figure 7:
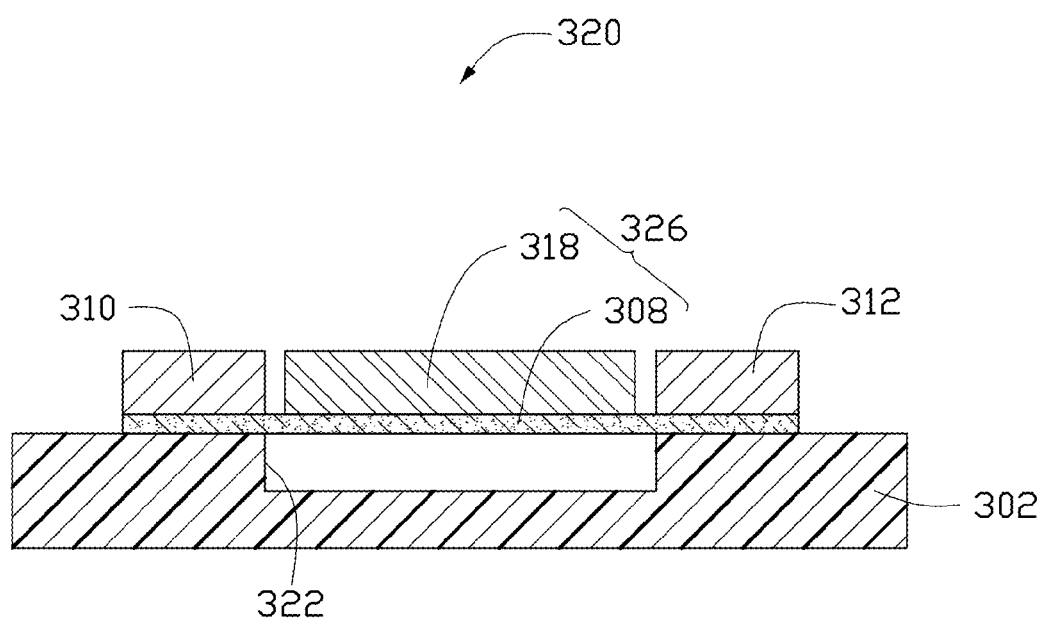
FIG. 7 is a schematic view of a second embodiment of a thermochromatic device.

Referring to FIG. 7, a thermochromatic device 320 of a second embodiment includes an insulating substrate 302, a color element 318, a heating element 308, a first electrode 310, and a second electrode 312. The color element 318 and heating element 308 form a composite 326. At least one part of the composite 326 is free of physical contact with any other element.

The thermochromatic device 320 is similar to the thermochromatic device 220 described above except that a recess 322 is formed in a surface of the insulating substrate 302, and the composite 326 is suspended over the recess 322. The color element 318 is made of color-changeable material.

In one embodiment, the heating element 308 covers the recess 322 and extends to the surface of the insulating substrate 302 for support. That is, the periphery of the heating element 308 is located on the surface of the insulating substrate 302, and the center portion of the composite 326 is suspended over the recess 322. The color element 318 is located only on the unsupported center portion of the heating element 308 so that less of the surface of the composite 326 is in contact with the insulating substrate 302. The first electrode 310 and the second electrode 312 are located on the portion of the heating element 308 that is on the insulating substrate 302.

The color-changeable material transforms between the crystalline and amorphous stages when a heat write voltage impulse or a heat erase voltage impulse is supplied to the heating element 308 to heat the color-changeable material. The heat write impulse is a sudden voltage to the heating element 308 and causes the thermochromatic device 320 to display. The heat erase impulse is a sudden voltage to the heating element 308 and causes the material to revert to its original appearance. When the thermochromatic device 320 needs to display, a heat write impulse, intensive but of short duration, is supplied to heat the color element 318. Because the temperature caused by the heat write impulse is very high, the color element 318 is instantly heated to a liquid state. Because the heating time caused by the heat write impulse is very short, the temperature of the color element 318 decreases almost instantly after the heat write impulse and the color element 318 reverts to an amorphous solid state from the liquid state. The color-changeable material of the color element 318 remains in an amorphous state, at a room temperature, without any outside energy being applied. Because the reflective properties of the crystalline color-changeable material and of the amorphous color-changeable material of the color element 318 are different, the color element 318 shows different brightnesses and the thermochromatic device 320 performs well as a display. In one embodiment, the brightness can be detected by the eye. When the display needs to be blanked out, a heat erase impulse, of less intensity and longer duration, can be supplied. This process is an annealing process. After annealing, the color-changeable material of the color element 318 changes to the original crystalline state from amorphous state, and the display is blanked out. The color-changeable material of the color element 318 remains in a crystalline state, at a room temperature, without any outside energy being applied. Because of this, the thermochromatic device 320 can perform as a bistable display. A bistable display means that a display does not require any outside energy to maintain either a displaying state or a non-displaying state.

In one embodiment, the temperature at which the color-changeable material of the color element 318 transforms between the crystalline and amorphous states is in a range from about 40° C. to about 600° C. The color-changeable material, having a temperature-governed phase change point above 40° C. allows the thermochromatic device 320 to work in a room temperature situation. The color-changeable material having a temperature-governed phase change point below 600° C. allows the thermochromatic device 320 to work at a low working voltage. In addition, the color-changeable material having a temperature-governed phase change point below 600° C. avoids oxidation of the heating element 208 of the carbon nanotube, and allows a long lifespan. The period of time of the phase change for the color-changeable material to transform between the crystalline and amorphous states is as short as possible so that the thermochromatic device 320 has a fast response speed. In one embodiment, the phase change time is shorter than 40 milliseconds.

The color-changeable material can be a chalcogenide compound such as sulfur-based compound, tellurium-based compound, selenium-based compound, or tellurium-selenium-based compound. The sulfur-based compound can be germanium-sulfur, arsenic-sulfur, or indium-sulfur. The tellurium-based compound can be germanium-tellurium, arsenic-tellurium, antimony-tellurium, or indium-tellurium. The selenium-based compound can be germanium-selenium, arsenic-selenium, antimony-selenium, or indium-selenium. Furthermore, additives improve the phase change speed of the color-changeable material. The additive can be copper, silver, gold, palladium, nickel, cobalt, or combinations thereof. The phase change time of the chalcogenide compound from crystalline to amorphous states is in a range from about several nanoseconds to about hundreds of nanoseconds. The phase change time of the chalcogenide compound from amorphous to crystalline states is in a range from about 0.5 microseconds to about 1 millisecond. In addition, other crystalline materials such as semiconductors, semiconductor compounds, metal compounds, or polymers having a phase change temperature above 40° C., will make the phase change time even shorter than 40 milliseconds, and different reflectivities of the crystalline and amorphous states can be used to achieve the color-changing function in the color element 318.

During operation, an impulse voltage is supplied to the first electrode 310 and the second electrode 312. The temperature of the heating element 308 rises and a burst of heat is supplied to the color element 318 from the heating element 308. When the impulse voltage is short and high, a short and intensive burst of heat is supplied by the heating element 308. When the impulse voltage is long and low, a longer and weaker heating is supplied by the heating element 308. When the thermochromatic device 320 needs to display, a short and intensive burst of heat is supplied to the color element 318. For example, the temperature of the burst of heat is in a range from about 900° C. to about 1000° C. and the duration of the heat write impulse voltage is in a range from about 50 nanoseconds to about 200 nanoseconds. Because the temperature caused by the heat write impulse is very high, the color element 318 is instantly heated to a liquid state. Because the heating time of the heat write impulse is very short, the temperature of the color element 318 decreases almost instantly after the burst of heat and the liquid state color element 318 becomes an amorphous solid. Because the reflectivity of the amorphous color-changeable material is different from that of the original crystalline color-changeable material, the color element 318 can show different brightnesses and the thermochromatic device 320 can display. The color-changeable material remains in amorphous state, at room temperature, without any outside energy being applied. When the thermochromatic device 320 needs to be blanked, a longer and weaker heat erase impulse can be supplied to the color element 318. For example, the temperature of the longer and weaker heat application is in a range from about 500° C. to about 600° C. and the duration of the heat erase impulse voltage is in a range from about 1 microsecond to about 1 millisecond. The process is an annealing process. After annealing the color-changeable material, it changes to the original crystalline state from the amorphous state, and the display is blanked. The color-changeable material can keep in a crystalline state, at room temperature, without any outside energy being applied. Because of this, a bistable display is created. The bistable display means that energy is only consumed during the process of writing and blanking, there is no energy consumption after these processes. Thus, the thermochromatic device 320 saves energy.

In one embodiment, the insulating substrate 302 is a PET film with a thickness of about 500 micrometers. The first electrode 310 and the second electrode 312 are formed by printing conductive slurry. The recess 322 is formed by an impressing process. The heating element 308 includes two layers of drawn carbon nanotube films. The color element 318 is a layer of germanium-selenium compound with a thickness from about 10 micrometers to about 500 micrometers. The color element 318 can be formed on the drawn carbon nanotube films by a sputtering or thermal deposition process.

Figure 8:
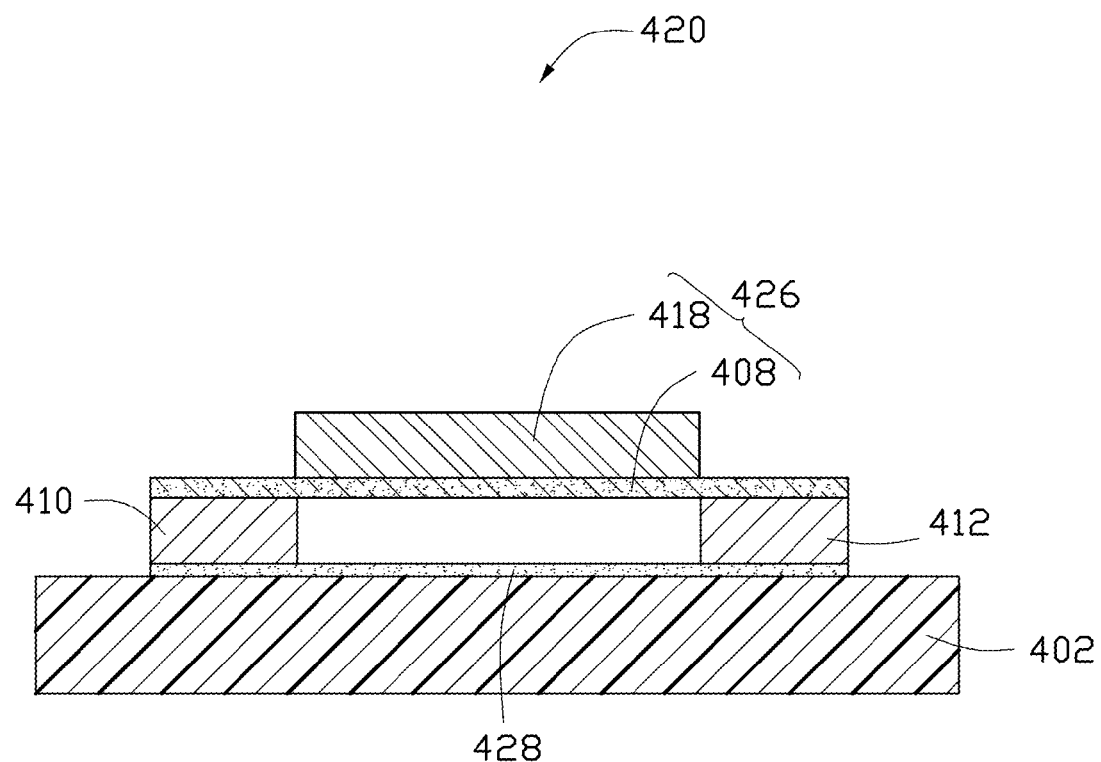
FIG. 8 is a schematic view of a third embodiment of a thermochromatic device.

Referring to FIG. 8, a thermochromatic device 420 of a third embodiment includes an insulating substrate 402, a background color layer 428, a color element 418, a heating element 408, a first electrode 410, and a second electrode 412. The color element 418 and heating element 408 form a composite 426. At least one part of the composite 426 is free of physical contact with any other element.

The thermochromatic device 420 is similar to the thermochromatic device 220 described above except that a background color layer 428 located on the surface of the insulating substrate 402 is included. The color element 418 is made of a material which can transform between a transparent state and a nontransparent state at a phase change temperature.

When the color element 418 is transparent, the thermochromatic device 420 reveals the color of the background color layer 428. When the color element 418 is nontransparent, the thermochromatic device 420 masks the background color layer 428 and presents a blank appearance. The phase change temperature of the color element 418 is below 200° C. In one embodiment, the phase change temperature of the color element 418 is in a range from about 40° C. to about 100° C. so that the thermochromatic device 420 can work in a room temperature environment using a low working voltage. The present disclosure provides three groups of possible materials for the color element 418, respectively named first color element 418, second color element 418 and third color element 418.

The background color layer 428 can be a layer of any material which can show a single color, or white or black. The color of the background color layer 428 will not change at a temperature below 200° C. The thickness of the background color layer 428 is in a range from about 1 micrometer to about 100 micrometers. The background color layer 428 can be formed by printing, spraying, coating, or sputtering.

The material of the first color element 418 is a mixture of polymer and fatty acid. The working principle of the first color element 418 is described as follows. The crystals of the material of the first color element 418 are in a dispersed state within a certain temperature range. The crystal size of the material of the first color element 418 performs a reversible change as the temperature changes. Different crystal sizes of the material of the first color element 418 cause different light transmissivities, so the material of the first color element 418 transforms between the transparent state and the nontransparent state. In one embodiment, the polymer and fatty acid mixture of the first color element 418 can be a mixture of vinylidene chloride acrylonitrile copolymer and eicosanoids, a mixture of butadiene styrene copolymer and stearic acid, or a mixture of vinyl chloride vinyl acetate copolymer and stearic acid.

The color element 418, made of the mixture of vinylidene chloride acrylonitrile copolymer and eicosanoids, is white and nontransparent at room temperature. When the color element 418 is heated to about 74° C. from room temperature by suddenly applying a heat write impulse, it becomes transparent and colorless. Thus, the thermochromatic device 420 reveals any color of the background color layer 428. When the color element 418 is heated to about 63° C. from room temperature by suddenly applying a heat erase impulse, it becomes white and nontransparent again. Thus, the color of the thermochromatic device 420 is masked. Because the heat impulse is short and the color element 418 will cool down to room temperature rapidly, either the transparent state or the nontransparent state can exist at room temperature. Thus, performance as a bistable display can be achieved. The bistable display means that a display does not require any outside energy to maintain either a displaying state or a non-displaying state.

In one embodiment, the mixture of butadiene styrene copolymer and stearic acid can be made by dissolving a butadiene styrene copolymer and a stearic acid in a mixture solution of THF and toluene. The mixture of butadiene styrene copolymer and stearic acid changes from nontransparent to transparent at a temperature of about 57° C. The mixture of butadiene styrene copolymer and stearic acid changes from transparent to nontransparent at a temperature of above 70° C.

The second color element 418 is a mixture of at least two polymers which are changeable between a compatible-elements state and an incompatible-elements state. The working principle of the second color element 418 is described as follows. The second color element 418 has a critical compatibility temperature above 40° C. When the temperature is below the critical compatibility temperature, the second color element 418 is colorless and transparent due to compatibility of the different polymer components or elements. When the temperature is above the critical compatibility temperature, the second color element 418 is nontransparent due to incompatibility between different polymer components. When the nontransparent second color element 418 cools down to between about 40° C. to about 10° C. from a temperature above the critical compatibility temperature, the nontransparent state persists, without any outside energy. When the second color element 418, in a nontransparent state, is heated to a temperature which is below the critical compatibility temperature but above 40° C., the nontransparent second color element 418 color element 418 becomes transparent. Because the transparent and the nontransparent states can persist within certain temperature limits, without any outside energy, any color displayed by the thermochromatic device 420 remains. Thus performance as a bistable display can be achieved. In one embodiment, the material of the second color element 418 is a mixture of vinylidene fluoride hexafluoroacetone copolymer and low molecular weight poly methyl methacrylate with a mass ratio of about 1:3. The polymerization degree of the poly methyl methacrylate is about 60%.

The third color element 418 is a polymer material which is phase-changeable between crystalline and amorphous states. The working principle of the third color element 418 is described as follows. Because the light transmissivity of the crystalline third color element 418 and the light transmissivity of the amorphous third color element 418 are different, the color element 418 transforms between transparent state and nontransparent state when a heat write impulse or a heat erase impulse is supplied. The heat write impulse allows the thermochromatic device 420 to display colors. The heat erase impulse blanks the display. In one embodiment, the third color element 418 is a polymer (1,4-thiophenol-1,4-divinylbenzene). The amorphous polymer (1,4-thiophenol-1,4-divinylbenzene) is transparent with a light transmissivity of 91%. The crystalline polymer (1,4-thiophenol-1,4-divinylbenzene) is nontransparent with a light transmissivity of less than 1%. The color element 418 is made of polymer (1,4-thiophenol-1,4-divinylbenzene) with a thickness from about 0.1 micrometers to about 0.5 micrometers and changes from a nontransparent crystalline state to a transparent amorphous state in about 1 second to about 2 seconds at a temperature of about 170° C., and changes from a transparent amorphous state to a nontransparent crystalline state in about 20 minutes to about 30 minutes at a temperature from about 70° C. to about 80° C.

When the thermochromatic device 420 needs to display colors, a short and intensive heat write impulse voltage heats the color element 418. Because the temperature caused by the heat write impulse voltage is very high, the color element 418 is instantly heated to a liquid state. Because the heating time of the heat write impulse is very short, the temperature of the color element 418 then decreases almost instantly and the liquid state color element 418 becomes a transparent amorphous solid. Thus, the thermochromatic device 420 reveals the color of the background color layer 428. The third color element 418 remains in a transparent amorphous state, at a room temperature, without any outside energy. When the thermochromatic device 420 needs to blank the display after the thermochromatic device 420 has cooled to room temperature, a longer and weaker heat erase impulse is applied to heat the color element 418. The process is an annealing process. After annealing, the third color element 418 of the color element 418 is changed to the original nontransparent crystalline state from a transparent amorphous state. Thus, the thermochromatic device 420 masks any color of the background color layer 428, and the display is blanked. The third color element 418 remains in a nontransparent crystalline state, at room temperature, without any outside energy. Because of this, the color originally displayed by the thermochromatic device 420 remains. Thus, performance as a bistable display can again be achieved.

In one embodiment, the insulating substrate 402 is a PET film with a thickness of about 300 micrometers. The first electrode 410 and the second electrode 412 are formed by printing conductive slurry. The heating element 408 includes a single layer of drawn carbon nanotube film. The color element 418 is a layer of polymer (1,4-thiophenol-1,4-divinylbenzene) with a thickness from about 10 micrometers to about 400 micrometers. The color element 418 can be formed on the suspended portion of the drawn carbon nanotube film by spraying, printing, sputtering or thermal deposition process.

Figure 9:
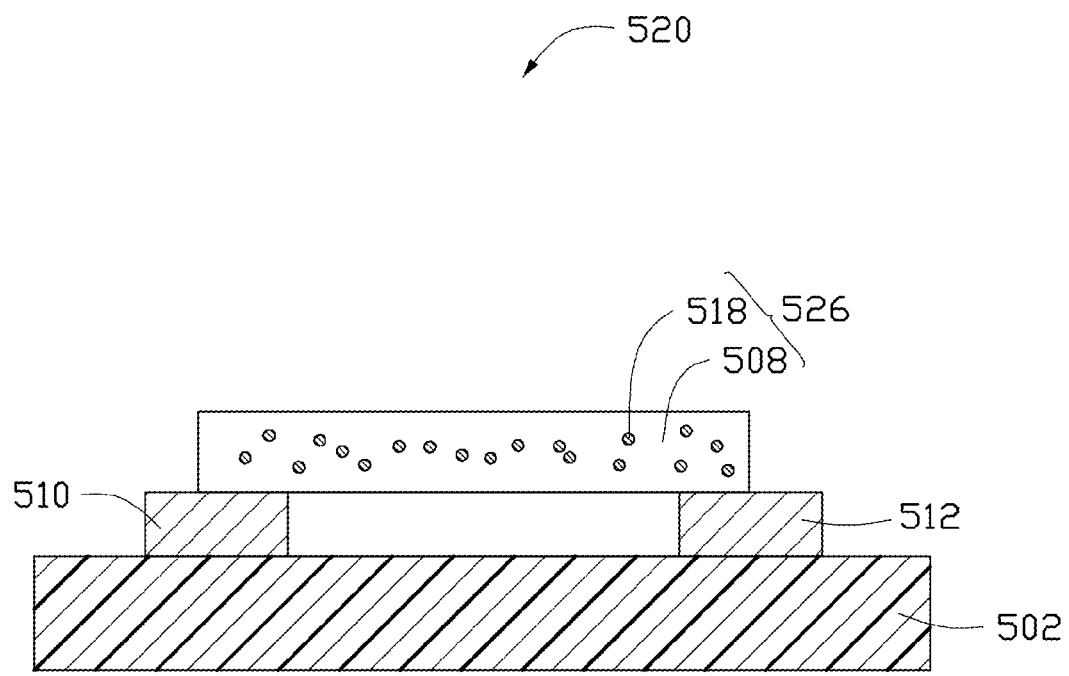
FIG. 9 is a schematic view of a fourth embodiment of a thermochromatic device.

Referring to FIG. 9, a thermochromatic device 520 of a fourth embodiment includes an insulating substrate 502, a color element 518, a heating element 508, a first electrode 510, and a second electrode 512. The color element 518 and the heating element 508 form a composite 526. At least one part of the composite 526 is free of physical contact with any other element.

The thermochromatic device 520 is similar to the thermochromatic device 220 described above except that the composite 526 includes a carbon nanotube wire used as the heating element 508 and a plurality of thermochromatic material powders dispersed in the carbon nanotube wire and used as the color element 518.

In one embodiment, the carbon nanotube wire includes a plurality of carbon nanotubes combined by van der Waals attractive force. The thermochromatic material powders are located on or between the plurality of carbon nanotubes. The composite 526 can be made by depositing the thermochromatic material on the carbon nanotube film, and then curling or twisting the carbon nanotube film with the thermochromatic material thereon to form the composite 526.

Figure 10:
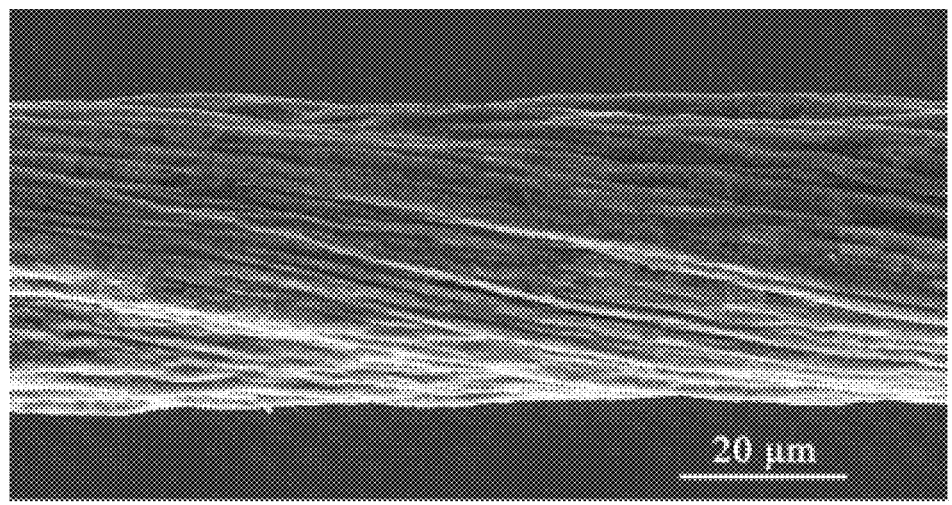
FIG. 10 is an SEM image of a composite of a color element and a heating element of the fourth embodiment.

As shown in FIG. 10, the carbon nanotube wire includes a plurality of carbon nanotubes helically oriented around an axial direction of the carbon nanotube wire and a plurality of thermochromatic material powders fixed to the carbon nanotube wire. Thus, the thermochromatic material powders of the color element 518 are firmly fixed to the carbon nanotube wire of the heating element 508 and are not easily removed or dislodged.

The disclosure further provides a thermochromatic display apparatus using the thermochromatic device described in above embodiments. The thermochromatic display apparatus includes a plurality of thermochromatic devices arranged to form a pixel matrix, a driving circuit capable of controlling the plurality of thermochromatic devices and a number of lead wires electrically connecting the driving circuit and the number of thermochromatic devices. The plurality of thermochromatic devices can use one common insulating substrate and be controlled by an addressing circuit. The thermochromatic display apparatus using the thermochromatic device 220 of the first embodiment is used below to illustrate the thermochromatic display apparatus of this embodiment of the disclosure.

Figure 11:
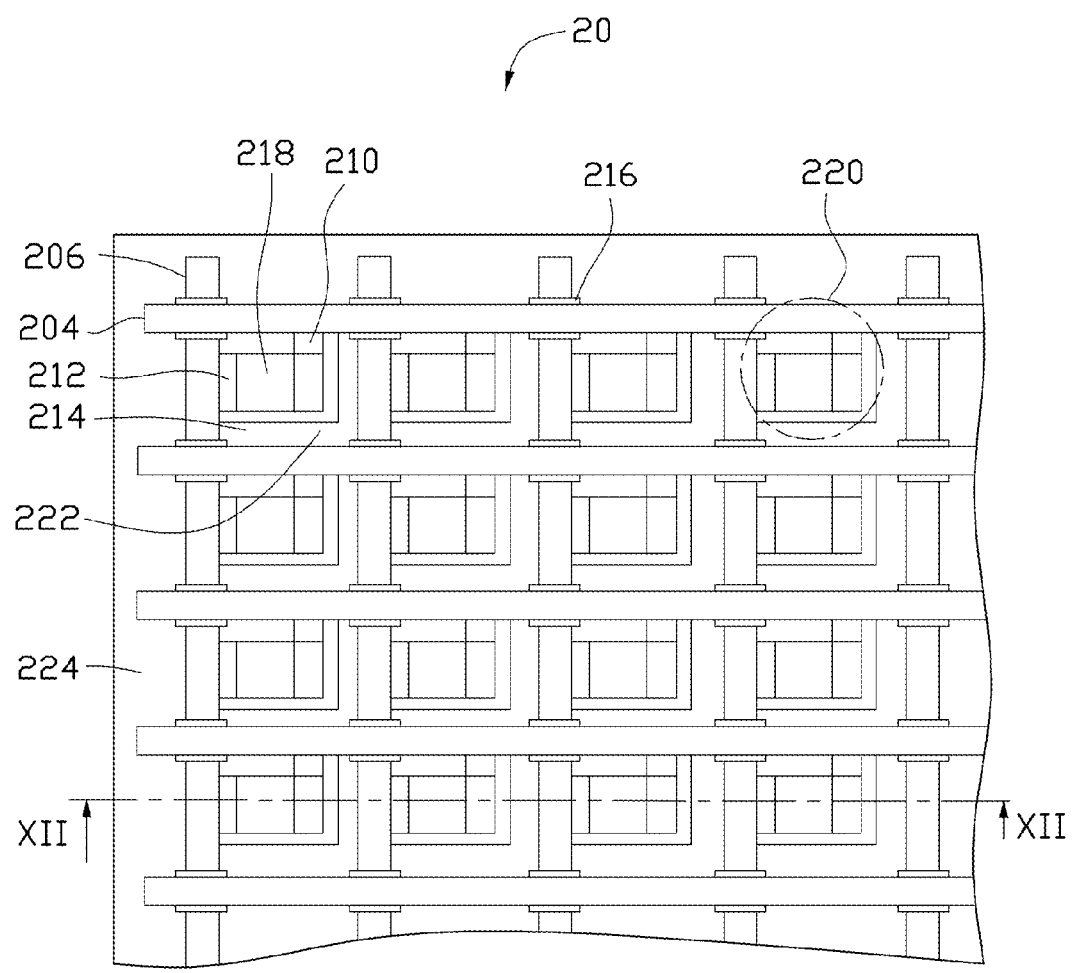
FIG. 11 is a schematic view of a thermochromatic display apparatus using the thermochromatic device of FIG. 1.
Figure 12:
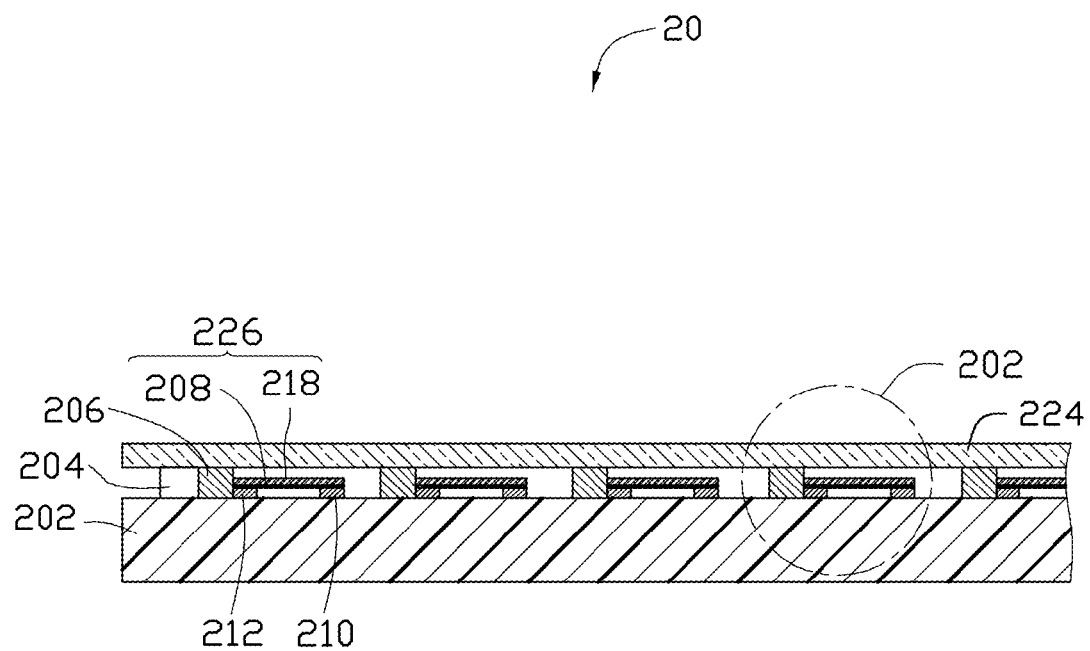
FIG. 12 is a schematic, cross-sectional view, along a line XII-XII of FIG. 11.

Referring to FIGS. 11 and 12, a thermochromatic display apparatus 20 includes an insulating substrate 202, a number of substantially parallel first electrode down-leads 204, a number of substantially parallel second electrode down-leads 206, and a number of thermochromatic devices 220. The first and second electrode down-leads 204, 206 are located on the insulating substrate 202. The first electrode down-leads 204 are generally set at an angle to the second electrode down-leads 206, forming a grid. A cell 214 is defined by each two substantially adjacent first electrode down-leads 204 and each two substantially adjacent second electrode down-leads 206 of the grid. One of the thermochromatic devices 220 is located in each cell 214. Each thermochromatic device 220 corresponds to one pixel of the thermochromatic display apparatus 20.

The insulating substrate 202 supports the first electrode down-leads 204, the second electrode down-leads 206, and the thermochromatic devices 220. The shape, size, and thickness of the insulating substrate 202 can be chosen according to need. In one embodiment, the insulating substrate 202 is a square PET substrate with a thickness of 1 millimeter and an edge length of 48 millimeters. The plurality of thermochromatic devices 220 uses a common insulating substrate 202.

The first electrode down-leads 204 are equidistantly apart. A distance between adjacent two first electrode down-leads 204 ranges from about 50 micrometers to about 2 centimeters. The second electrode down-leads 206 are equidistantly apart. A distance between adjacent two second electrode down-leads 206 ranges from about 50 micrometers to about 2 centimeters. A suitable orientation of the first electrode down-leads 204 and the second electrode down-leads 206 is that they are set at an angle with respect to each other. The angle of divergence ranges from about 10 degrees to about 90 degrees. In one embodiment, the angle is 90 degrees, and the cell 214 is square in shape.

The first electrode down-leads 204 and the second electrode down-leads 206 are made of conductive material such as metal or conductive slurry. In one embodiment, the first electrode down-leads 204 and the second electrode down-leads 206 are formed by applying conductive slurry on the insulating substrate 202 using a screen printing process. The conductive slurry is composed of metal powder, glass powder, and binder. The metal powder can be silver powder, the glass powder having low melting point, and the binder can be terpineol or ethyl cellulose (EC). The conductive slurry includes about 50% to about 90% (by weight) of the metal powder, about 2% to about 10% (by weight) of the glass powder, and about 8% to about 40% (by weight) of the binder. In one embodiment, each of the first electrode down-leads 204 and the second electrode down-leads 206 are formed with a width in a range from about 30 micrometers to about 100 micrometers and with a thickness in a range from about 10 micrometers to about 50 micrometers. However, the dimensions of each of the first electrode down-leads 204 and the second electrode down-leads 206 must vary to correspond with dimensions of each cell 214.

The first electrodes 210 of the thermochromatic devices 220 are arranged in a row of the cells 214 and are electrically connected to the first electrode down-lead 204. The second electrodes 212 of the thermochromatic devices 220 are arranged in a column of the cells 214 and are electrically connected to the second electrode down-lead 206.

Each of the first electrodes 210 has a length in a range from about 20 micrometers to about 15 millimeters, a width in a range from about 30 micrometers to 10 millimeters and a thickness in a range from about 10 micrometers to about 500 micrometers. Each of the second electrodes 212 has a length in a range from about 20 micrometers to about 15 millimeters, a width in a range from about 30 micrometers to about 10 millimeters and a thickness in a range from about 10 micrometers to about 500 micrometers. In one embodiment, the first electrode 210 has a length in a range from about 100 micrometers to about 700 micrometers, a width in a range from about 50 micrometers to about 500 micrometers and a thickness in a range from about 20 micrometers to about 100 micrometers. The second electrode 212 has a length in a range from about 100 micrometers to about 700 micrometers, a width in a range from about 50 micrometers to about 500 micrometers and a thickness in a range from about 20 micrometers to about 100 micrometers.

The first electrodes 210 and the second electrode 212 can be made of metal or conductive slurry. In one embodiment, the first electrode 210 and the second electrode 212 are formed by screen printing the conductive slurry on the insulating substrate 202. As mentioned above, the conductive slurry forming the first electrode 210 and the second electrode 212 is the same material as that used to form the electrode down-leads 204, 206.

The thermochromatic display apparatus 20 includes a plurality of insulators 216 sandwiched between the first electrode down-leads 204 and the second electrode down-leads 206, to avoid short-circuiting. The insulators 216 are located at every intersection of the first electrode down-leads 204 and the second electrode down-leads 206 and provide electrical insulation. In one embodiment, the insulator 216 is a dielectric insulator.

In one embodiment, 16×16 (16 rows stacked one above another, and 16 thermochromatic devices 220 on each row) thermochromatic devices 220 are arranged on a square PET insulating substrate 202 with an edge length of 48 millimeters. Each heating element 208 is a single drawn carbon nanotube film with a length of 300 micrometers and a width of 100 micrometers. The single drawn carbon nanotube film is fixed on the surface of the insulating substrate 202 with an adhesive. The ends of the heating element 208 are located between the insulating substrate 202 and the electrodes 210 and 212. The carbon nanotubes of the heating element 208 extend from the first electrode 210 to the second electrode 212.

The thermochromatic display apparatus 20 includes a heat-resistant material 222 located around each thermochromatic device 220. The heat-resistant material 222 can be in a space between the thermochromatic device 220 and the electrode down-leads 204, 206 in the cell 214. The thermochromatic devices 220 in adjacent cells 214 are heat-insulated and thus will not thermally interfere with each other. The heat-resistant material 222 can be aluminum oxide ($Al_2O_3$) or organic material such as PET, PC, PE, or PI. In one embodiment, the heat-resistant material 222 is PET with a thickness the same as the thickness of the electrode down-leads 204, 206. The heat-resistant material 222 can be formed by printing, chemical vapor deposition (CVD) or a physical vapor deposition (PVD) process. In one embodiment, the heat-resistant material 222 in each cell 214 extends around and is spaced from the thermochromatic device 220 so that the composite 226 is prevented from being in contact with the heat-resistant material 222 and the heating response speed of the thermochromatic device 220 is thus further improved.

The thermochromatic display apparatus 20 includes a protecting layer 224 located on the insulating substrate 202 to cover all the electrode down-leads 204, 206, and the thermochromatic devices 220. The protecting layer 224 is an insulating and transparent layer that can be made of aluminum oxide (Al$_2$O$_3$), silicon dioxide (SiO$_2$), or organic material such as PET, PC, PE, or PI. The thickness of the protecting layer 224 can be selected according to need. In one embodiment, the protecting layer 224 is a PET sheet with a thickness in a range from about 0.5 millimeter to about 2 millimeters. The protecting layer 224 prevents the thermochromatic display apparatus 20 from being damaged and polluted. In one embodiment, the protecting layer 224 is spaced from the thermochromatic device 220 so that the composite 226 is prevented from being in contact with the protecting layer 224 and the heating response speed of the thermochromatic device 220 is thus further improved. The protecting layer 224 and the insulating substrate 202 are sealed.

In use, the thermochromatic display apparatus 20 includes a driving circuit (not shown) to drive the thermochromatic display apparatus 20 to display an image. The driving circuit controls the thermochromatic devices 220 through the electrode down-leads 204, 206 to display moving images. The color change speed of the pixel units of the thermochromatic display apparatus 20 is fast enough because at least one part of the composite 226 is free of physical contact with any other element and thus heat-isolated. The thermochromatic display apparatus 20 can be used in a field of advertisement billboards, newspapers, or electronic books.

It is to be understood that the above-described embodiments are intended to illustrate rather than limit the disclosure. Any elements described in accordance with any embodiments can be used in addition or as substitutes in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A thermochromatic device, comprising:
an insulating substrate;
at least one color element located on the insulating substrate;
at least one heating element located on the insulating substrate; and
a first electrode and a second electrode electrically connected to the heating element;
wherein the color element and the heating element form a composite, and at least one part of the composite is suspended over the insulating substrate; wherein both the heating element and the color element are layered and stacked with each other, and two color elements are located on two opposite surfaces of the heating element.

2. The thermochromatic device of claim 1, wherein the at least one part of the composite suspended over the insulating substrate is supported by the first electrode and the second electrode.

3. The thermochromatic device of claim 1, wherein the at least one part of the composite is suspended over a recess defined in the insulating substrate.

4. The thermochromatic device of claim 1, wherein the color element comprises a reversible thermochromatic material.

5. The thermochromatic device of claim 1, wherein the color element comprises a transparence-changeable material; and the transparence-changeable material changes from a transparent state to a nontransparent state at a phase change temperature, and vice versa.

6. The thermochromatic device of claim 1, wherein the color element comprises a color-changeable material; and a phase of the color-changeable material changes from a crystalline state to an amorphous state at a temperature above 40° C., and vice versa, and a first reflectivity of the color-changeable material in the crystalline state and a second reflectivity of the color-changeable material in the amorphous state are different.

7. The thermochromatic device of claim 1, wherein the heating element comprises a carbon nanotube structure.

8. The thermochromatic device of claim 7, wherein the carbon nanotube structure comprises a carbon nanotube film comprising a plurality of carbon nanotubes substantially oriented along an alignment direction, and the plurality of carbon nanotubes are joined end-to-end in the alignment direction.

9. The thermochromatic device of claim 8, wherein a heat capacity per unit area of the carbon nanotube film is less than 2×10$^{-4}$ J/m$^2$·K.

10. The thermochromatic device of claim 7, wherein the carbon nanotube structure comprises a carbon nanotube wire comprising a plurality of carbon nanotubes substantially oriented along a length direction of the carbon nanotube wire or helically oriented around an axial direction of the carbon nanotube wire; and the color element comprises a plurality of reversible thermochromatic material powders dispersed in the carbon nanotube wire.

11. A thermochromatic display apparatus, comprising:
an insulating substrate;
a plurality of first electrode down-leads located on the insulating substrate, wherein the plurality of first electrode down-leads are substantially parallel;
a plurality of second electrode down-leads located on the insulating substrate, wherein the plurality of second electrode down-leads are substantially parallel, and the plurality of first electrode down-leads are set an angle relative to the plurality of second electrode down-leads to form a grid, and each two adjacent of the first electrode down-leads and each two adjacent of the second electrode down-leads of the grid define a plurality of cells; and
a plurality of thermochromatic devices, wherein each of the plurality of thermochromatic devices is located in each of the plurality of cells, and each of the plurality of thermochromatic devices comprises:
at least one color element located on the insulating substrate;
at least one heating element located on the insulating substrate; and
a first electrode and a second electrode electrically connected to the heating element;
wherein the color element and the heating element form a composite, and at least one part of the composite is suspended over the insulating substrate; wherein both the heating element and the color element are layered and stacked with each other, and two color elements are located on two opposite surfaces of the heating element.

12. The thermochromatic display apparatus of claim 11, further comprising a heat-resistant material located around and spaced from each of the plurality of thermochromatic devices.

13. The thermochromatic display apparatus of claim 11, further comprising a protecting layer located on the insulating substrate to cover the plurality of first electrode down-leads, the plurality of second electrode down-leads and the plurality of thermochromatic devices; and the protecting layer is spaced from the composite.

14. A thermochromatic device, comprising:
an insulating substrate;
at least one color element located on the insulating substrate;
at least one heating element located on the insulating substrate; and
a first electrode and a second electrode electrically connected to the heating element;
wherein the color element and the heating element form a composite, and at least one part of the composite is suspended over the insulating substrate; wherein both the heating element and the color element are layered and stacked with each other, and a plurality of color elements and a plurality of heating elements are alternately stacked with each other to form a multi-layered structure.

15. The thermochromatic device of claim 14, wherein the at least one part of the composite suspended over the insulating substrate is supported by the first electrode and the second electrode.

16. The thermochromatic device of claim 14, wherein the at least one part of the composite is suspended over a recess defined in the insulating substrate.

17. The thermochromatic device of claim 14, wherein the color element comprises a reversible thermochromatic material.

18. The thermochromatic device of claim 14, wherein the color element comprises a transparence-changeable material; and the transparence-changeable material changes from a transparent state to a nontransparent state at a phase change temperature, and vice versa.

19. The thermochromatic device of claim 14, wherein the color element comprises a color-changeable material; and a phase of the color-changeable material changes from a crystalline state to an amorphous state at a temperature above 40° C., and vice versa, and a first reflectivity of the color-changeable material in the crystalline state and a second reflectivity of the color-changeable material in the amorphous state are different.

20. The thermochromatic device of claim 14, wherein the heating element comprises a carbon nanotube structure.

* * * * *